United States Patent
Itskin et al.

(10) Patent No.: US 6,185,523 B1
(45) Date of Patent: Feb. 6, 2001

(54) APPARATUS AND METHOD FOR COMPUTER SYSTEM INTERRUPT EMULATION

(75) Inventors: Randall Clay Itskin; Stephen Dale Linam, both of Austin; Maulin Ishwarbhai Patel, Round Rock, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/166,437

(22) Filed: Oct. 5, 1998

(51) Int. Cl.$^7$ .................................................. G06F 9/455
(52) U.S. Cl. ............................................. 703/28; 703/26
(58) Field of Search ..................... 703/28, 26; 712/227; 714/30, 727; 717/4

(56) References Cited

U.S. PATENT DOCUMENTS

| | | | |
|---|---|---|---|
| 5,479,652 | * 12/1995 | Dreyer et al. ........................... | 714/30 |
| 5,884,023 | * 3/1999 | Swoboda et al. ....................... | 714/30 |
| 5,983,017 | * 11/1999 | Kemp et al. ............................. | 717/4 |
| 5,983,379 | * 11/1999 | Warren .................................. | 714/727 |
| 6,041,406 | * 3/2000 | Mann .................................... | 712/227 |

OTHER PUBLICATIONS

M. Winters, *Using IEEE–1149.1 for In–Circuit Emulation*, WESCON/94, Idea/Microelectronics, Conference Record, 1994, pp. 525–528.*

D. Gonzales, *Tool Reusable for DSP System Emulation and Board Production Testing*, Northcon/96, 1996, pp. 306–311.*

Ing–Jer Huang and Tai–An Lu, *Iceberg: An Embedded In–Circuit Emulator Synthesizer for Microcontrollers*, Design Automation Conference, 1999, Proceedings, 36th, pp. 580–585.*

Texas Instruments, Inc., TI Addresses PCI Multi–Drop for IEEE 1149.1, web page. Copyright 1997, pp. 1–3 <www.ti.com/sc/docs/jtag/jtag.pci.htm>.

IBM, Inc., PowerEM Emulators, web page, Copyright 1998, pp. 1–5 <www.chips.ibm.com/products/ppc/documents/catalog/sgdt_x3.htm>.

* cited by examiner

*Primary Examiner*—Kevin J. Teska
*Assistant Examiner*—Russell W. Frejd
(74) *Attorney, Agent, or Firm*—Kelly K. Kordzik; Winstead Sechrest & Minick P.C.; Leslie A. Van Leeuwen

(57) ABSTRACT

Accordingly, provided is an apparatus and method for generating a computer system interrupt emulation having the effect of a hardwired interrupt. A service processor with a test circuit interface can be coupled to an integrated circuit, which has a test circuit with an access to a register of the integrated circuit. A program, executable by the processor, responds to an interrupt request by instructing the processor to save a system state of the integrated circuit and to set a system state of the integrated circuit. The method for emulating an interrupt of an integrated circuit provides for receiving an interrupt request. A register of an integrated circuit is then accessed through a test circuit of the integrated circuit. The contents of the register are saved to a storage location, and the register is then set to a state responsive to the interrupt request. The interrupt request may be made locally or remotely.

31 Claims, 3 Drawing Sheets

APPARATUS AND METHOD FOR COMPUTER SYSTEM INTERRUPT EMULATION

TECHNICAL FIELD

The present invention relates in general to data processing systems, and in particular, to an emulation of a computer system interrupt.

BACKGROUND INFORMATION

Computer system interrupts are a computer system microprocessor's means of communicating with other elements that make up a computer system. In general, computer system interrupts have been passed directly to the computer system microprocessor through the interrupt terminals of the microprocessor. The interrupt causes the microprocessor to suspend its current operations, save the status of its work, and transfer control to a special routine (known as an interrupt handler) that causes a particular set of instruction to be carried out. Interrupts have been generated for many reasons, ranging from normal to highly abnormal. These can include service requests from various hardware devices, errors in processing, program attempts to cause the computer system to do functions it is not capable of performing, and imminent failure of some vital component.

Nevertheless, only a limited number of hardwire interrupts—interrupts physically connected to a microprocessor interrupt terminal through control circuitry—could be accommodated by a processor, or they could not be implemented due to the complexity of a computer system's architecture.

Accordingly, a need exits for emulating a hardwired interrupt to achieve the same computer system effect on the system hardware, without having a hardwired interrupt connection to a microprocessor interrupt terminal.

BRIEF SUMMARY OF THE INVENTION

Accordingly, provided is an apparatus and method for generating a computer system interrupt emulation having the effect of a hardwired interrupt. A service processor with a test circuit interface can be coupled to an integrated circuit, which has a test circuit with access to a register of the integrated circuit. A program, executable by the service processor, responds to an interrupt request by instructing the service processor to save a system state of the integrated circuit and to set a system state of the integrated circuit. The method for emulating an interrupt of an integrated circuit provides for receiving an interrupt request. A register of an integrated circuit is then accessed through a test circuit of the integrated circuit. The contents of the register are saved to a storage location, and the register is then set to a state responsive to the interrupt request. The interrupt request may be made locally or remotely.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
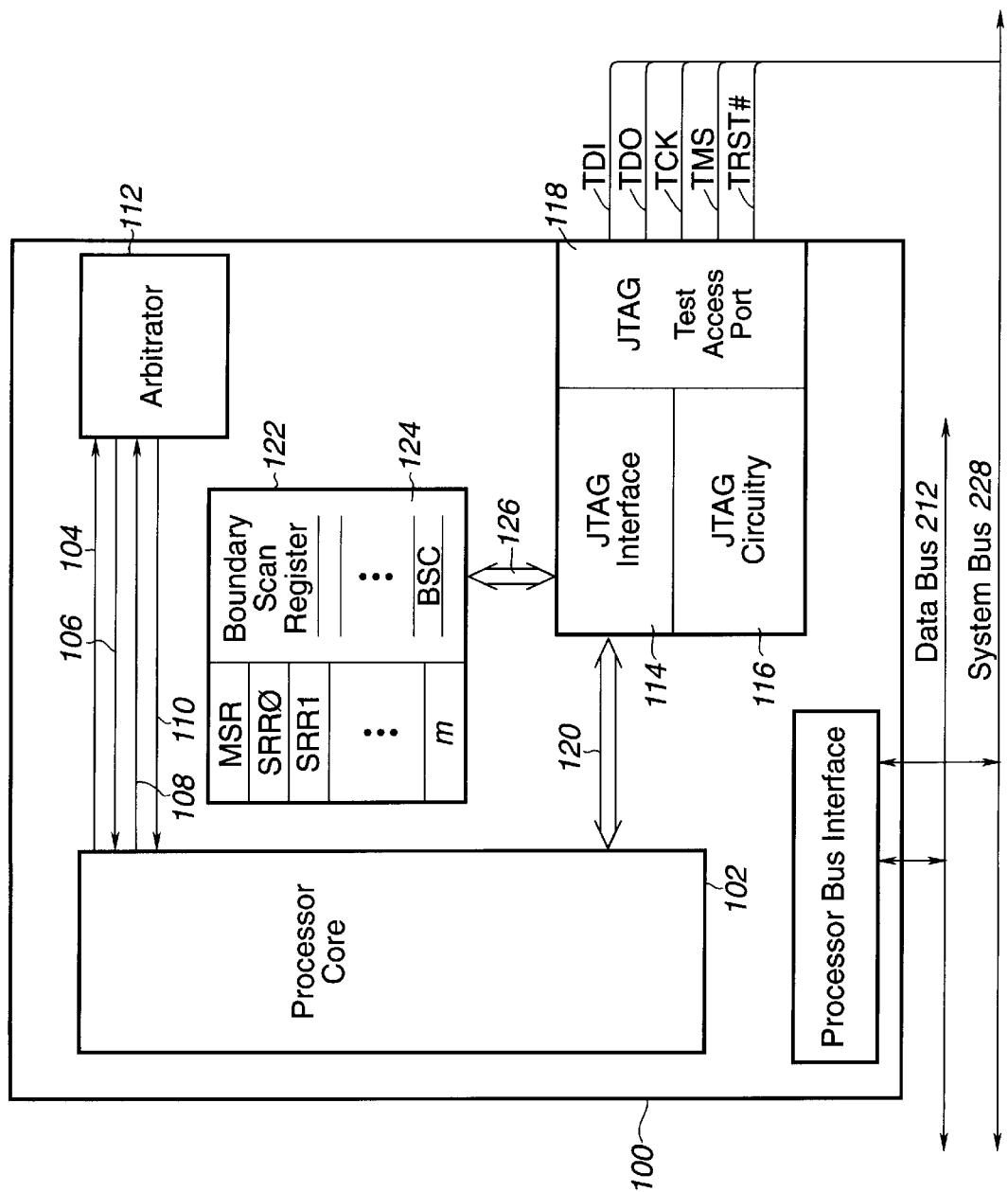
FIG. 1 is a block diagram of a digital microprocessor integrated circuit with test circuitry for accessing registers of the digital microprocessor.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

Although the present invention is described with reference to a specific embodiment of a digital microprocessor using a JTAG test access port ("TAP") for setting the states of an integrated circuit with respect to the interrupt, it should be understood that an emulation of a computer system interrupt of the present invention may be adapted for use with other digital processing devices having comparable hardware capabilities, and serial data outputs including, by way of example, microprocessors, microcontrollers, and digital signal processors having limited bandwidth serial data outputs.

Furthermore, the computer system interrupt emulation of the present invention may be adaptable to a test bus portion of the system bus 228 (see FIG. 2) in communication with a plurality semiconductor devices having a TAP. All such variations are intended to be included within the scope of the present invention. It will be recognized that, in the drawings, only those signal lines and processor blocks necessary for the operation of the present invention are shown.

Conventionally, the meaning of the term "interrupt" includes an external signal that causes a microprocessor circuit to suspend current execution, and in response to the external signal, execute an exception handler, which is a predefined code sequence addressing the information conveyed by the external signal. The information may convey either an unusual or error condition, or an event external to the system microprocessor that requires attention.

The present invention has the advantage of allowing a service processor to inform the system microprocessor, or processors, of an interrupt condition although conventional hardware connections may be absent. For example, an insufficient number of interrupt terminals on a microprocessor due to previous assignment for other uses.

Referring to the drawings, depicted elements are not necessarily shown to scale, and like or similar elements are designated by the same reference numeral through the several views.

Referring to FIG. 1, shown is a block diagram of a digital microprocessor 100 having JTAG circuitry according to the IEEE standard 1149.1. A processor core 102 controls the operation of the microprocessor 100. The processor core 102 receives data and instructions via lines 106 and 110 from an arbitrator block 112, and outputs instruction and data addresses to the arbitrator block 112 via lines 104 and 108. A Joint Test Action Group ("JTAG") interface 114, JTAG circuitry 116, and TAP 118 are coupled to the processor core 102 through an internal bus 120. The JTAG interface 114 and circuitry 116 are provided to interpret JTAG signals received over TAP 118.

The TAP 118 enables the digital microprocessor 100 to connect to other external serial JTAG devices directly, for component test and debug purposes, or for connection to a test bus portion of the system bus 228 that interconnects other JTAG circuitry in a computer system for conventional uses such as system monitoring and programming.

Information concerning the digital microprocessor 100 is stored in a Boundary Scan Register ("BSR") 122, which has a plurality of Boundary Scan Cells ("BSC") 124. The BSR 122 may be coupled to the JTAG components through lines 126. The JTAG interface 114, circuitry 116, and TAP 118, with the BSR 122, form a boundary-scan architecture with a cell 124 for every input/output ("I/O") pin, or the boundary, on the integrated-circuit device 100.

The integrated-circuit device 100 uses the Status Save/Restore ("SRR") registers SRR0 and SRR1 to save the contents of a Machine State Register ("MSR") and to also identify where instruction-execution should resume after the interrupt is handled. Where instruction-execution should resume is typically stored in a processor's Program Counter ("PC") register, which may also be referred to as an Instruction Address Register ("IAR").

The TAP 118 uses a serial synchronous data exchange protocol and has five signal lines: Test Data Input ("TDI"); Test Data Output ("TDO"); Test Port Clock ("TCK"); Test Mode Select ("TMS"); and Test Port Reset (TRST#). The TDI signal is a serial bit stream that goes into either the JTAG circuit control/command registers or the BSR 122 that control the pin drivers register on the processor core 102. The TDO signal is a serial bit stream that goes to the test bus portion of the system bus 228 (or tester circuit coupled to the TAP 118), and contains information shifted out of BSR 122. The TCK signal is a synchronous clock that accompanies data transfers through the TAP 118.

Data on the input line TDI is sampled on the rising edge of the TCK signal. Data on the output line TDO is sampled on the falling edge of the TCK signal. The TMS signal, used in conjunction with TDI, controls the state machine of the JTAG that determines the state of the TAP-related circuitry and the direction of data streams within the digital microprocessor 100. The TRST# signal is an optional signal that resets the TAP state machine to a predetermined initial state.

The TAP 118 is a small controller design, driven by the TCK input, which responds to the TMS signal input. A test bus uses both clock edges of the TCK signal. The TMS and TDI signals are sampled on the rising edge of the TCK signal. The TDO signal changes on the falling edge of the TCK signal.

A standardized device description language is used to communicate with the JTAG circuitry 116 of the digital processor 100. This language is called Boundary-Scan Description Language ("BSDL"), which captures the essential features of the IEEE standard 1149.1 implementation. The BSDL is described in IEEE standard 1149.1 b, which is incorporated by reference herein.

Figure 2:
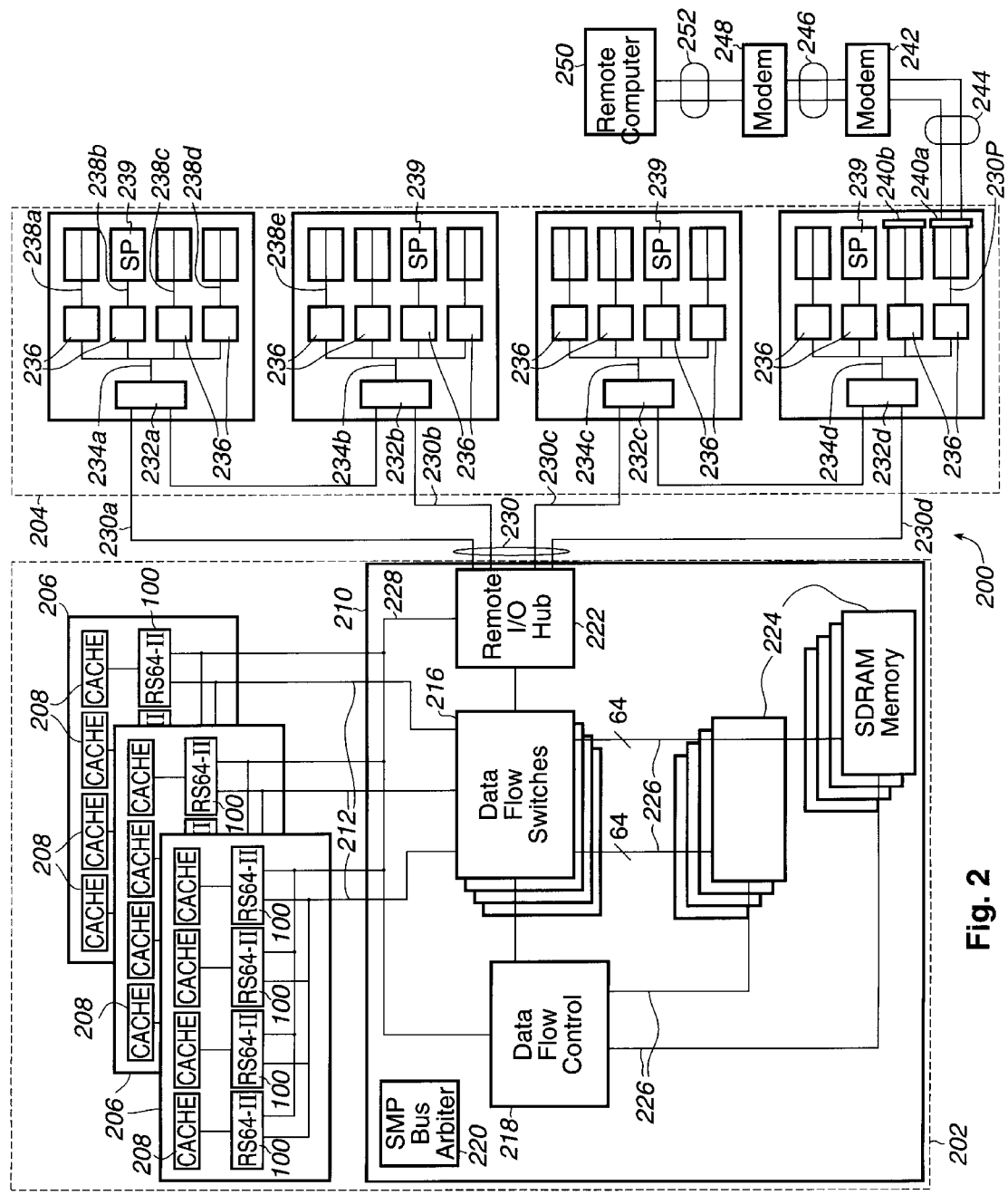
FIG. 2 is a block diagram of a computer system in which the interrupt emulation of the present invention is implemented.

FIG. 2 is a block diagram of a complex computer system 200 in which the interrupt emulation of the present invention is utilized. The computer system 200 depicted is a complex server system that exemplifies the need for an interrupt emulation of a computer system processor through a service processor.

The interrupt emulation of the present invention uses a Service Processor ("SP") having a test-circuit interface to the TAP 118. The test-circuit interface may be a direct coupling to the TAP 118, or a coupling through a test bus portion of the system bus 228 that interconnects the TAPs of the computer system.

The test circuit interface is used for electrically-coupling to an integrated circuit having a test circuit to access at least one register for generating an interrupt request response without interfering with the operation of the integrated circuit. The service, or remote input/output ("RIO"), processor executes a program that instructs the RIO processor to save the system state contents of the register and to set the system state of the integrated circuit through a test circuitry—accessed through the TAP 118—previously used in the manufacturing debug process for the circuit.

In FIG. 2, the computer system 200 has a Central Electronics Complex ("CEC") 202 and an I/O drawer 204. The CEC 202 contains processor cards 206 having processors 100. The processors 100 may be PowerPC RS64-II processors that are commercially available from the IBM Corporation of Armonk, N.Y. The RS64-II processor operates at about 262 MHZ, has separate 64 kilobyte caches for instructions and data. The RS64-II processor has a Level 2 cache controller and a dedicated 32 byte interface to a private 4-way set associative 8 megabyte Level 2 cache.

The processors 100 are arranged in a Symmetric Multi-Processing ("SMP") architecture for high-end commercial performance. which may be provided in a four, eight, and twelve processor configuration. The computer system 200 shown in FIG. 2 is a twelve processor configuration. It should be noted that additional processors may be implemented through other computer system architectures.

The processor cards 206 have level-2 cache memory 208, each having a size of about 8 Megabytes. The processor cards are electrically-coupled to a memory controller complex 210 through three SMP system data buses 212, which are preferably configured to run at a speed consistent with the processor 100. A fourth SMP system data bus 212 is coupled to an Remote I/O ("RIO") hub chip 222. The computer backplane is provided by the data flow switches 216, data-flow control chip 218, and SMP bus arbiter circuit 220.

A backplane is understood to be a pathway on which electrical signals travel between devices, similar to a bus. Unlike a bus, however, a backplane serves to connect devices having disparate component architectures.

The arbiter circuit 220 monitors and manages competing demands for bus resources, such as memory or pathways, made by the multiple processes of the computer system 200.

The SDRAM memory 224 is electrically-coupled to the data flow switches 216 through 64-byte data paths 226. Addressing of the SDRAM memory 224 is addressed through memory address lines of the system bus 228.

The processor cards 206 are coupled to a system bus 228, which provides information between the data flow control chip 218, the RIO hub chip 222, and the SMP bus arbiter 220. The system bus 228 uses a 128-bit data path and a separate 64-bit address path. Address, data, and control are parity checked, and transfer sequences are validity checked by the system bus 228. Also, the system bus 228 provides a test bus that interfaces with the JTAG test circuitry 116 through the TAP 118 of the processors 100 (see FIG. 1). The RIO bridge bus chips 232a, 232b, 232c, and 232d convert the respective RIO connections 230a,a, 230b, 230c, and 230d to the local mezzanine busses 234a, 234b, 234c, and 234d.

The mezzanine busses 234a, 234b, 234c, and 234d provide a reduced signal version of the system bus 228 that has been optimized for input/output purposes, as well as the ability for access to the test bus component of the system bus 228.

The I/O drawer 204 is connected to the system bus 228 through the RIO hub chip 222, which supports four RIO connections 230a, 230b, 230c, and 230d. The RIO connections 230 are scalable high-speed, point-to-point interfaces having low latency, high-bandwidth connections between the CEC 202 and the I/O drawer 204. The RIO connections 230a, 230b, 230c, and 230d are configured as loops so that the RIO hub chip 222 directs data traffic around the loop in an optimal fashion for performance, and will redirect traffic if link errors occur.

The PCI bridge chips 236 convert the mezzanine bus busses 234a, 234b, 234c, and 234d to PCI local busses 238a through 238p. PCI is a specification that defines a local bus system for a computer built to the PCI specification. The PCI local bus requires the presence of a PCI controller card, which must be installed in one of the PCI-compliant slots. The PCI controller card is provided with a remote input/output ("RIO") processor 239, which can be a Service Processor executing a firmware program discussed in detail with respect to FIG. 3.

The RIO processor 239 is a microprocessor preferably having high-speed performance and computational power sufficient to accommodate control of the PCI local bus, and to accommodate requests relating to maintenance and servicing of the CEC 202. A suitable microprocessor is the PowerPC 603, available from the IBM Corporation. It should also be noted that in simpler computer systems, such as the Personal Computer, an RIO processor 239 may be provided by a comparatively less complex logic chip implemented in an Application Specific Integrated Circuit ("ASIC"), or a Field Programmable Logic Array ("FPLA").

Serial ports 240a and 240b are coupled to the RIO processor 239 for remote access, through modem communications or the like, to the computer system 200.

The term "remote" as used herein means not in the immediate vicinity of the computer system, the computer system being remotely accessible by another device located in another place (being a room, building, city, state, or country) that is accessible through some type of cable or communications link.

As shown in FIG. 2, the serial port 240a is electrically coupled to a modulator/demodulator ("modem") 242 using a serial cable 244. The modem 242 is operated through communications software programs known by those skilled in the art. Accordingly, the operation of a modem and associated communications software is not discussed in further detail. Simply put, the modem 242 enables the computer system 200 to transmit information over a POTS telephone line 246. Because a computer is a digital device, and a POTS telephone line is an analog device, the modem 242 is needed to convert digital information from the computer system 200 to an analog signal. The analog signal transmitted over the telephone line 246 is received by the remote modem 248, which converts the analog signal back into a digital signal for processing by the remote computer, or service center, 250. The remote computer 250 is a workstation, which is a powerful stand-alone computer. But other less powerful computers such as a Personal Computer ("PC") may be used.

The RS-232-C standard, which is incorporated by reference herein, is an accepted industry standard for serial communications connections that has been adopted by the Electrical Industries Association ("EIA"). This Recommended Standard ("RS") defines the specific lines and signal characteristics used by serial communications controllers to standardize the transmission of serial data between devices. The designation "C" denotes that version of the standard is the third in a series.

As discussed above, and as FIG. 2 shows, the complex nature of the computer system 200 complicates the ability to apply a hardwired interrupt due to the distribution of multiple processors 100, and the need for the interrupt terminals of the processors 100 to be allocated for parallel processing functions. The computer system 200 is commercially-available under the RS/6000 S70 Model from the IBM Corporation of Armonk, N.Y. The RS/6000 series may be operated under an AIX Unix operating system, version 4.3.

System-caused interrupts are classified as: system reset interrupts, machine check interrupts, external interrupts, and decrementer interrupts. The nature and function of these interrupts are known to those skilled in the art, and accordingly, are not discussed in further detail herein.

Despite the allocation of the interrupt terminals, these computer systems need certain interrupts for maintaining and servicing the CEC 202 and the I/O drawer 202 though control of the hardware states in response to an interrupt. An example of such an interrupt is the system reset interrupt, which affects the component states of the computer system 200.

Figure 3:
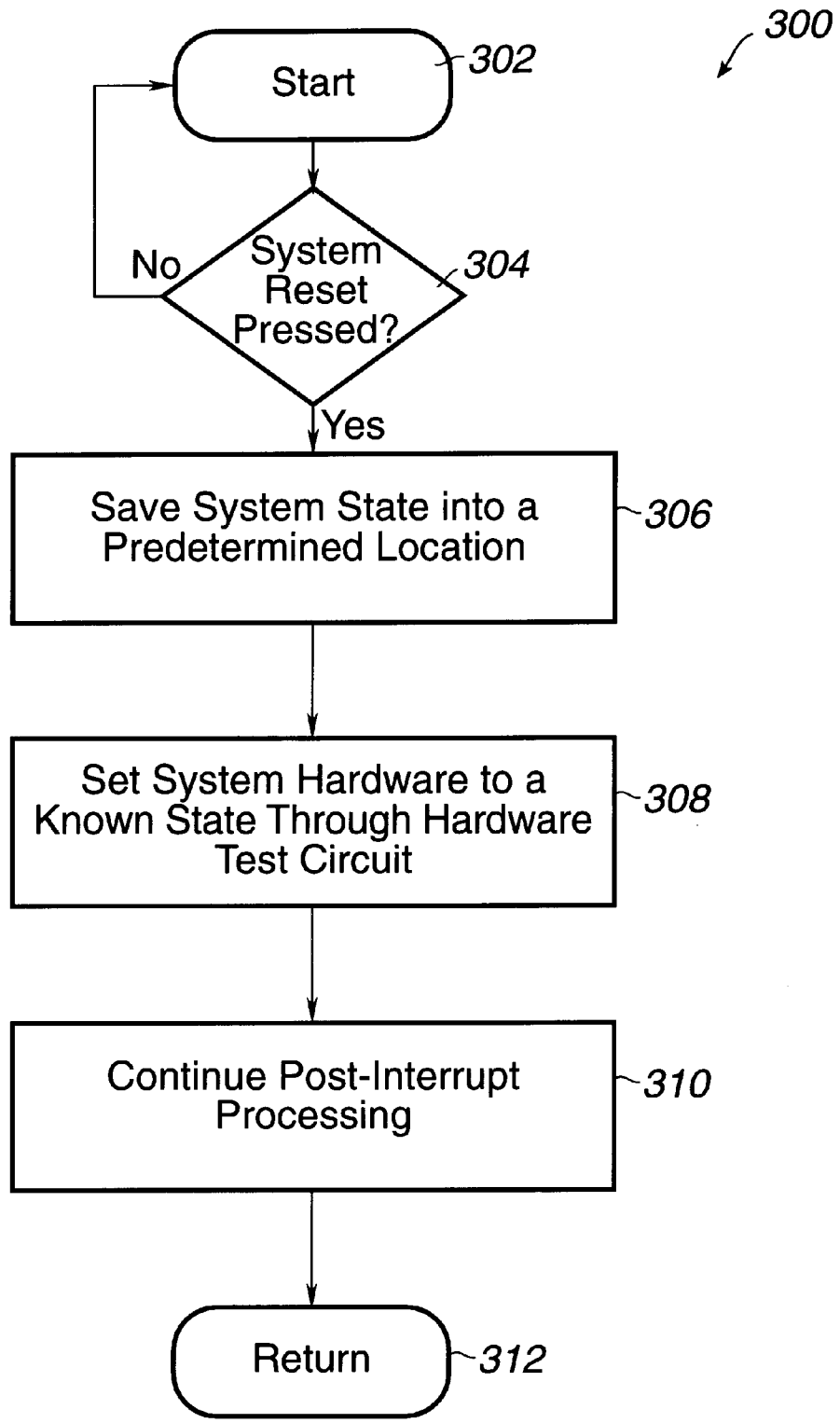
FIG. 3 is a flow chart illustrating the interrupt emulation of the present invention.

Referring to FIG. 3, shown is a flow chart 300 for the interrupt emulation of the present invention. The process described is for a system interrupt, but it should be noted that the present invention is applicable to other interrupt emulations requiring state changes of computer system hardware.

After the computer system 200 is in an operational mode at step 302, the RIO Processor 239 at step 304, determines whether a system interrupt request—in this example a system reset—was made. The determination of whether an interrupt request was made may be performed through techniques known to those skilled in the art. For example, the determination may be made by polling a register location. The system interrupt request may be made locally, by pressing a reset button of the computer system 200, or through a remote communications method through the serial ports 240. If there is no interrupt request, the computer system 200 continues with other operations (return to step 302).

If, at step 304, an interrupt request is determined to have been submitted, then the interrupt emulation begins. The RIO processor 239 accesses the registers of the microprocessors 100 of the CEC 202 through the respective TAPs 118, which are coupled to the RIO processor 239 through the system bus 228, and RIO hub chip 222. With respect to a system reset interrupt, in step 306, the system states of the microprocessors 100 are saved to a predetermined location. The predetermined location is typically another register location in the microprocessor, or it may be an address location in a hard-disk drive, or other non-volatile memory of the computer system 200.

After the microprocessor states are saved, in step 308, the RIO processor 239 sets the system 200 hardware to a known state through the respective test accesses ports 118 (see FIG. 1).

With respect to a system reset interrupt, the register SRR0 is set to the effective address of the instruction that the respective processor 100 would have attempted to execute next if no interrupt conditions were present. Register SRR1, and bit positions 33:36 {1:4}, 42:47 {10:15} are set to "0." Bit 62 {30} of the register SRR1 is loaded from the value of the Machine State Register ("MSR") if the processor is in a recoverable state; otherwise, it is set to "0." The MSR is then set to 00100 (hexadecimal). Microprocessor execution then resumes at step 310 at offset 0x00100 from the base real address indicated by the MSR[IP] bit. Setting the MSR[IP] bit specifies whether an interrupt vector offset is prepended with hexadecimal values "F" or "0," and the processors return from the interrupt at step 312. An interrupt vector is a software address pointer to the place in memory where an interrupt routine is kept. An interrupt vector contains the address, or location, of the routine and is used when a program needs to call the routine to perform a service, such as getting input characters.

Accordingly, the present invention described herein is effectively transparent to the system processor being accessed. An agent in the computer system 200 (the service processor 239) is allowed to interact with the system processors 100 of the computer system 200 through their respective JTAG circuitry. This interaction allows the interrupt emulation wherein the system processors behave as though a system reset interrupt was received through the typical method, that is, an interrupt signal going to a pin terminal of the system processor. Nevertheless, the system processor 100, and the code executing on the processor, are unaware that the system reset interrupt was invoked by the emulated interrupt of the present invention, instead of through the interrupt pin terminal of the processor.

Although the present invention and its advantages have been described in detail, it should be understood that various changes, substitutions and alterations can be made herein without departing from the spirit and scope of the invention as defined by the appended claims.

What is claimed is:

1. An apparatus for emulating computer system interrupts, the apparatus comprising:
   a processor with a test circuit interface for electrically-coupling to an integrated circuit having a test circuit with access to a register of the integrated circuit; and
   a program executable by said processor, said program, in response to an interrupt request, having said processor save a system state of said integrated circuit and set a system state of said integrated circuit, wherein said interrupt request is a system reset interrupt.

2. The apparatus of claim 1 further comprising:
   a data-and-instruction communication device electrically-coupled to said processor.

3. The apparatus of claim 1 wherein said test circuit interface is a Test Access Port ("TAP") interface.

4. The apparatus of claim 2 wherein said interrupt request is provided to said processor through said data-and-instruction communication device.

5. The apparatus of claim 1 wherein said integrated circuit is a JTAG-compliant integrated circuit.

6. The apparatus of claim 2 wherein said data-and-instruction communication device is a MODEM.

7. The apparatus of claim 2 wherein said data-and-instruction communication device is an Integrated Services Digital Network ("ISDN") telecommunications line.

8. A method for emulating an interrupt, the method comprising the steps of:
   (a) receiving an interrupt request;
   (b) accessing a register of an integrated circuit through a test circuit of the integrated circuit;
   (c) saving a content of the register in a storage location; and
   (d) setting the register to a state responsive to the interrupt request, wherein the interrupt request is a system reset interrupt.

9. The method as recited in claim 8 wherein the interrupt request is received from a remote source.

10. The method as recited in claim 8 wherein the integrated circuit is a JTAG-compliant integrated circuit.

11. The method as recited in claim 8 wherein the storage location is another register of the integrated circuit.

12. The method as recited in claim 8 wherein the state includes an interrupt vector and a register bit sequence.

13. An apparatus for emulating an interrupt comprising:
   means for receiving an interrupt request;
   means for accessing a register of an integrated circuit through a test circuit of the integrated circuit;
   means for saving a content of the register in a storage location; and
   means for setting the register to a state responsive to the interrupt request, wherein said interrupt request is a system reset interrupt.

14. The apparatus of claim 13 wherein said receiving means is a processor.

15. The apparatus of claim 13 wherein said accessing means is accessing means is a test access port.

16. The apparatus of claim 13 wherein said integrated circuit is JTAG-compliant.

17. The apparatus of claim 13 wherein the storage location is another register of the integrated circuit.

18. An apparatus for emulating computer system interrupts, the apparatus comprising:
   at least one JTAG-compliant integrated circuit having a test circuit with access to a register of said at least one integrated circuit;
   a processor having a test circuit interface coupled to said test circuit through a bus; and
   a program executable by said processor, said program, in response to an interrupt request, having said processor save a system state of said integrated circuit and set a system state of said integrated circuit, wherein said interrupt request is a system reset interrupt.

19. A method for emulating a system reset interrupt to a multiple processor (MP) system, said MP system comprising two or more system processors, a service processor, and a test bus coupling said two or more system processors and said service processor, said method comprising the steps of:
   executing stop code in said service processor in response to a system reset signal coupled to said service processor, said stop code operable to set a stop instruction register bit in each of said two or more system processors using test signals coupled to said two or more system processors via said test bus;
   executing interrupt code in said service processor after executing said stop code, said interrupt code operable to set a processor interrupt register bit in each of said two or more system processors using said test signals coupled to said two or more system processors via said test bus;
   executing start code in said service processor after executing said stop code and said interrupt code, said start code operable to reset said stop instruction register bit in each of said two or more system processors using said test signals coupled to said two or more system processors via said test bus; and
   executing in each of said two or more system processors a system reset instruction sequence when said processor interrupt register bit is set and said stop instruction bit is reset, said system reset instruction sequence executing pre-determined reset operations within each of said two or more system processors.

20. The method of claim 19, wherein said processor interrupt register bit is also coupled to a hardware processor reset interrupt input on each of said two or more system processors.

21. The method of claim 19, wherein said two or more system processors are Joint Test Access Group (JTAG) compliant.

22. The method of claim 19, wherein said test bus is a Test Access Port (TAP) compliant bus.

23. The method of claim 19, wherein said system reset signal is a remote signal coupled to said service processor via a communication port.

24. The method of claim 22, wherein said service processor includes a TAP controller.

25. The method of claim 23, wherein said communication port includes a MODEM.

26. An apparatus for emulating a system reset interrupt to a multiple processor (MP) system, said MP system comprising two or more system processors, remote circuits, and a test bus coupling said two or more system processors and said remote circuits, said remote circuits further comprising:

a stop circuit receiving a system reset signal, said stop circuit, in response to said remote signal, operable to set a stop instruction register bit in each of said two or more system processors using remote test signals coupled to said system processor via said test bus;

an interrupt circuit receiving from said stop circuit a stop complete signal when said stop instruction bits are set, said interrupt circuit operable to set a processor interrupt register bit in each of said two or more system processors using said remote test signals coupled to said system processor via said test bus;

a start circuit receiving from said interrupt circuit an interrupt complete signal when said processor interrupt register bits are set, said start circuit operable to reset said stop instruction bit in each of said two or more system processors using said remote test signals coupled to said system processor via said test bus; and system reset instruction circuits in each of said two or more system processors operable, when said processor interrupt register bit is set and said stop instruction bit is reset, to execute pre-determined reset operations within each of said two or more system processors.

27. The apparatus of claim 26 said system processor reset register bit also coupled to a hardware reset input on each of said two or more system processors.

28. The apparatus of claim 26, wherein said remote circuits are in a Test Access Port (TAP) controller.

29. The apparatus of claim 26, wherein said system reset signal is a remote signal coupled to said stop circuit via a communication port.

30. The apparatus of claim 28, wherein said remote test signals are TAP bus signals.

31. The apparatus of claim 29, wherein said communication port is a MODEM.

* * * * *